UNITED STATES PATENT OFFICE.

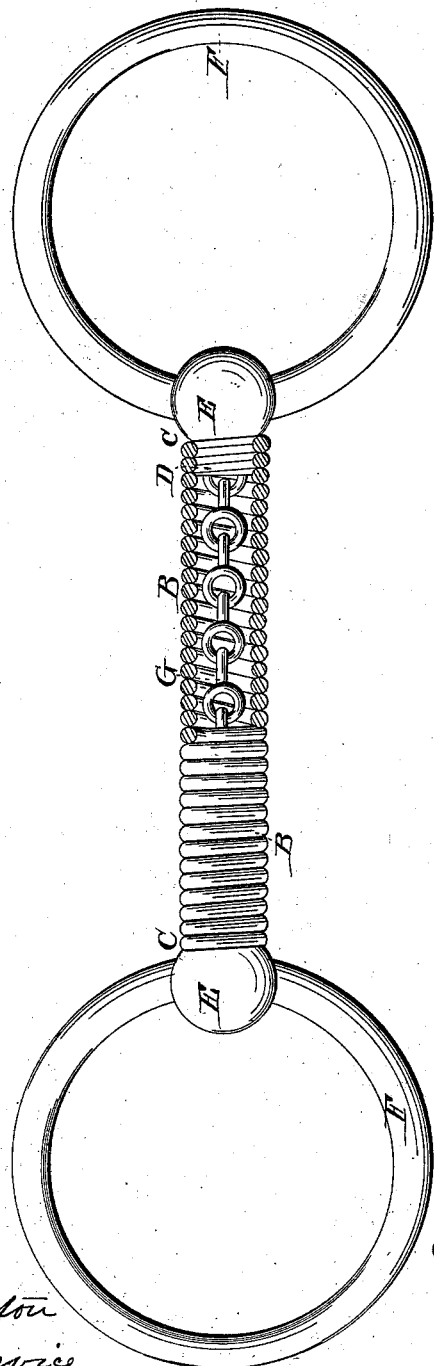

F. N. FROST, OF NEW BRITAIN, CONNECTICUT.

IMPROVED BRIDLE-BIT.

Specification forming part of Letters Patent No. 56,923, dated August 7, 1866.

*To all whom it may concern:*

Be it known that I, FRANCIS N. FROST, of New Britain, in the county of Hartford and State of Connecticut, have invented new and useful Improvements in Bits; and I do hereby declare that the following is a full, clear, and exact description thereof, which will enable others skilled in the art to make and use the same, reference being had to the accompanying drawing, forming part of this specification.

The present invention consists in forming the bit to be used in the mouths of horses or other animals of a spirally-wound or closely-coiled metallic wire, whereby great flexibility combined with strength is obtained, and a bit produced with which a more perfect control of the animal while being driven can be secured, as will be obvious from the following detail description of the same, reference being had to the accompanying drawing, in which the figure is a side view of the bit in the direction of its length, with a portion of one end in section.

A in the drawing represents the bit, which is made of a spirally-wound or closely-coiled metallic wire, B, of the proper length and size, having screwed or otherwise properly inserted in each of its ends C a similar plug, D, terminating in an eye, E, in which the rings F are hung, through which the reins of the harness pass, one ring to each eye E. These plugs D are connected together by a chain, G, passing through the interior of the coiled bit A, for the purpose of affording additional strength to the bit, and, in case it should by any means or in any possible manner become broken, prevent it from becoming detached or falling out of the mouth of the horse or other animal in which it is used.

By forming the bit of a closely-coiled or spirally-wound wire, as hereinabove described, it is plainly obvious that great flexibility is secured, thereby enabling the bit to be so brought to bear upon the mouth of the horse or other animal in which it is used, when so desired or necessary, as to place the horse immediately under the control and management of the driver, the importance of which is manifest to all, the bit not only possessing great flexibility, but yet sufficiently strong, and especially when a connecting-chain or other suitable means which will not affect its flexibility is used upon the inside of the bit, as above explained, being perfectly safe and secure against all exigencies which may possibly occur or arise.

I claim as new and desire to secure by Letters Patent—

1. A bit for horses or other animals, made of a closely-coiled or spirally-wound metallic wire, substantially as described.

2. In combination with the above, the use of a chain or its equivalent, as and for the purpose specified.

The above specification of my invention signed by me this 16th day of May, 1866.

FRANCIS N. FROST.

Witnesses:
ALBERT W. BROWN,
M. M. LIVINGSTON.